US005697520A

United States Patent [19]

Gerber

[11] Patent Number: 5,697,520

[45] Date of Patent: Dec. 16, 1997

[54] MOSAIC TILE MAKER

[75] Inventor: David J. Gerber, Hartford, Conn.

[73] Assignee: Gerber Scientific Products, Inc., Manchester, Conn.

[21] Appl. No.: 517,443

[22] Filed: Aug. 21, 1995

Related U.S. Application Data

[63] Continuation-in-part of Ser. No. 105,603, Aug. 12, 1993, Pat. No. 5,443,680.

[51] Int. Cl.[6] .......... B65G 59/00

[52] U.S. Cl. .......... 221/105; 221/120

[58] Field of Search .......... 221/252, 105, 221/119, 120, 121

[56] References Cited

U.S. PATENT DOCUMENTS

| | | | |
|---|---|---|---|
| 1,133,604 | 3/1915 | Alcan | 156/561 |
| 1,666,232 | 7/1928 | Boynton | 156/562 |
| 2,715,289 | 8/1955 | Gale | 156/561 |
| 2,876,574 | 3/1959 | Powell | 156/562 |
| 2,931,751 | 4/1960 | Du Fresne | 156/561 |
| 3,162,937 | 12/1964 | Schweiker | 156/561 |
| 3,181,987 | 5/1965 | Polevitzky | 156/562 |
| 3,294,284 | 12/1966 | Chambers | 221/120 |
| 3,322,591 | 5/1967 | Cleverly | 156/562 |
| 3,463,695 | 8/1969 | Schweiker et al. | 156/556 |
| 3,988,728 | 10/1976 | Inoue et al. | 156/556 |
| 4,305,130 | 12/1981 | Kelley et al. | 156/560 |
| 4,359,815 | 11/1982 | Toyoda | 156/561 |
| 4,415,909 | 11/1983 | Italiano et al. | 156/556 |
| 4,524,421 | 6/1985 | Searby et al. | 156/562 |
| 4,546,025 | 10/1985 | Vaisman | 156/556 |
| 4,599,254 | 7/1986 | Cuttica | 428/45 |
| 4,641,271 | 2/1987 | Konishi et al. | 364/478.05 |
| 4,704,694 | 11/1987 | Czerniejewski | 382/288 |
| 4,715,772 | 12/1987 | Kanayama | 414/230 |
| 4,757,470 | 7/1988 | Bruce et al. | 395/135 |
| 4,845,634 | 7/1989 | Vitek et al. | 364/468.03 |
| 4,851,073 | 7/1989 | Satou | 156/560 |
| 4,852,024 | 7/1989 | Kurakake | 382/276 |
| 4,869,813 | 9/1989 | Baily et al. | 156/561 |
| 4,878,178 | 10/1989 | Takakura et al. | 345/199 |
| 4,878,181 | 10/1989 | MacKenna et al. | 156/562 |
| 4,878,183 | 10/1989 | Ewart | 395/128 |
| 4,891,767 | 1/1990 | Rzasa et al. | 395/94 |

FOREIGN PATENT DOCUMENTS

| | | | |
|---|---|---|---|
| 2676025 | 4/1991 | France . | |
| 2676300 | 5/1991 | France . | |
| 500751 | 7/1930 | Germany | 221/120 |
| 2701628 | 1/1997 | Germany . | |
| 60-23100 | 2/1985 | Japan . | |
| 64-8299 | 3/1989 | Japan . | |
| 4-42289 | 7/1992 | Japan . | |

OTHER PUBLICATIONS

European Search Report, Dec. 16, 1994.
Interface—1986 Annual Report.
"Design News" Jun. 8, 1992.

*Primary Examiner*—Kenneth Noland
*Attorney, Agent, or Firm*—McCormick, Paulding & Huber

[57] ABSTRACT

An apparatus for automatically creating a simulated mosaic controllably discharges tile pieces onto plate material and secures the tile pieces in place such that the plates with the tile pieces am freestanding permitting the plates themselves to be an ordered arrangement of sections of the mosaic once cemented to the substrate. Many different forms may be had for the plate material, including ones that are pressure or heat activatable to bond with the tile pieces or ones that are mechanically connectable.

10 Claims, 10 Drawing Sheets

MOSAIC TILE MAKER

The present invention is a continuation-in-part of application Ser. No. 08/105,603, filed on Aug. 12, 1993 now U.S. Pat. No. 5,443,680.

BACKGROUND OF THE INVENTION

The present invention relates to a system and related method for creating art work using tile pieces and deals more particularly with an automated tiling system whereby tilings are arranged in an ordered collection of plates in accordance with numeric data representing a pattern to be followed by the tile pieces such that the ordered collection of plates once bonded to a substrate surface depict the pattern initially prescribed by the input data.

Hitherto, the creation of tile plates, that is, the pre-made assembly of the tile pieces and the material backing on which they are attached, were manufactured for the most part by hand. This involved the time consuming process of hiring people to pick and place individual tile pieces in a given arrangement on the plate material. The manual arrangement of tilings on a backing material has without doubt many problems associated with it, and among these problems is that the complexity of the design to be carried out is limited by the skill of the worker. Attempts have been made to simplify the creation of designs. One such attempt is disclosed in U.S. Pat. No. 2,715,289 wherein fabrication of repetitive or nonrepetitive designs is accomplished using plates having a repeating pattern baked in them. The design is created by varying the orientation of the individual plates relative to one another. A mosaic is thus created by the juxtaposition of each plate with the other. However, the tile pieces used are all of the same shape and size so that there is no aesthetic enhancement through shape and size variances. Also, there is no point-by-point color variation capability with this system, thus making it virtually impossible to portray different designs outside of those which are provided for by the system.

With the advancement of new scanning technology, the ability to take an image and transpose it into digital form for use in a computer is readily available. The availability of such scanning technology presents countless possibilities for decorating interiors and exteriors of an environment. In addition, surfaces on commonly found items, such as plazas, walkways, pool areas, coffee tables, dining tables, counter tops, mantle pieces and wall hangings, could all be decorated in tile with exquisite beauty using the data representing the design which is to be represented by the tile pieces. In digital form, a desired design could be projected electronically in a simulation of an environment in which it is to be used. That is, data representing a graphic in digitized form quite easily lends itself to being displayed on a screen, or printed by a multicolored laser jet printer on paper in the case where a hard copy is desired. However, while it is very possible to create and maintain such graphic representations of a given design electronically in a computer, implementing this data to drive numerically controlled machinery to create a simulated mosaic involves correlating the rules of tiling mathematics with the numeric control logic of the implementing machines.

Additionally, the capability of computers taken from a stand point of storing and executing complex equations and matrices, such as, equations involving the laws of tessellism or pointillism which govern tiling pattern design, is made virtually automatic through the use of such technology. The placement of the basic geometric shapes often used in creating a mosaic, such as squares, hexagons or triangles, while hitherto primarily arranged in a monohedral relationship, can be integrated with one another by using appropriate software. Examples of such are prototiles in which equilateral triangles, squares and regular hexagons can be arranged in a myriad of different formations by execution of the appropriate algorithm in the computer. The laying out of individual tiles to physically determine whether or not they fit within a given confine, as is presently done by hand, can further be simplified by an overall algorithm for automatically creating a tiling by computer.

Accordingly, it is an object of the present invention to provide a system wherein a computer is employed mathematically to arrange tile pieces on plates in accordance with data representing a pattern to be depicted by the tile pieces and wherein data is used by the system for controlling a handling device which places individual tile pieces onto a plate material at predetermined locations to create the desired tile arrangement.

A further object of the invention is to provide a system of the aforementioned type wherein a design which is to cover a contiguous environment is capable of being projected in a portrayal of that environment prior to the actual assembling of tiles pieces onto plates.

It is yet a further object of the present invention to provide a system of the aforementioned type whereby a simulated mosaic can be bonded to a surface using an ordered arrangement of plates which are coded to correspond to a designated area of the surface to be covered by the plates.

SUMMARY OF THE INVENTION

The invention resides in a method and related apparatus for creating a desired pattern design wherein tile pieces are arranged on individual plates in accordance with a general panoramic scheme for which each of the plates has a designated position in the overall layout. The system includes, for this purpose, a base support surface for providing a surface upon which a material is supported and onto which material tile pieces are deposited. A delivery means is disposed in a spatial relationship proximate the base support surface for applying tile pieces onto the material supported by the base support surface at predetermined locations thereon. A drive means controllably positions the base support surface and the delivery means relative to one another such that the delivery means is positioned relative to the base support surface at the predetermined locations. A supply means communicates with the delivery means for providing a supply of tile pieces to be deposited on the base support surface through the delivery means. Control means connects the drive means and the delivery means to controllably position the delivery means relative to the base support surface at the predetermined locations and for causing the delivery means to discharge a tile piece at one of the predetermined locations. The predetermined locations are defined for each tile piece discharged by control data used by the control means to effect positioning by the delivery means and the support surface relative to one another and to effect discharge of the tile pieces by the delivery means at the predetermined locations onto the material supported by the base support surface.

The invention further resides in a method of creating a simulated mosaic whereby an ordered collection of plates is provided and on each of which plates is disposed a plurality of tile pieces in a given arrangement such that the plates collectively, when affixed to a decorated surface as an ordered collection, present a desired artistic effect.

According to a preferred embodiment of the invention, the tile pieces are supplied to the delivery means in the order the pieces are to be discharged by the delivery means at the predetermined locations. This can be accomplished by preloading the supply means with the tile pieces in the order they are to be discharged.

DETAILED DESCRIPTION OF THE PREFERRED EMBODIMENT

Figure 1:
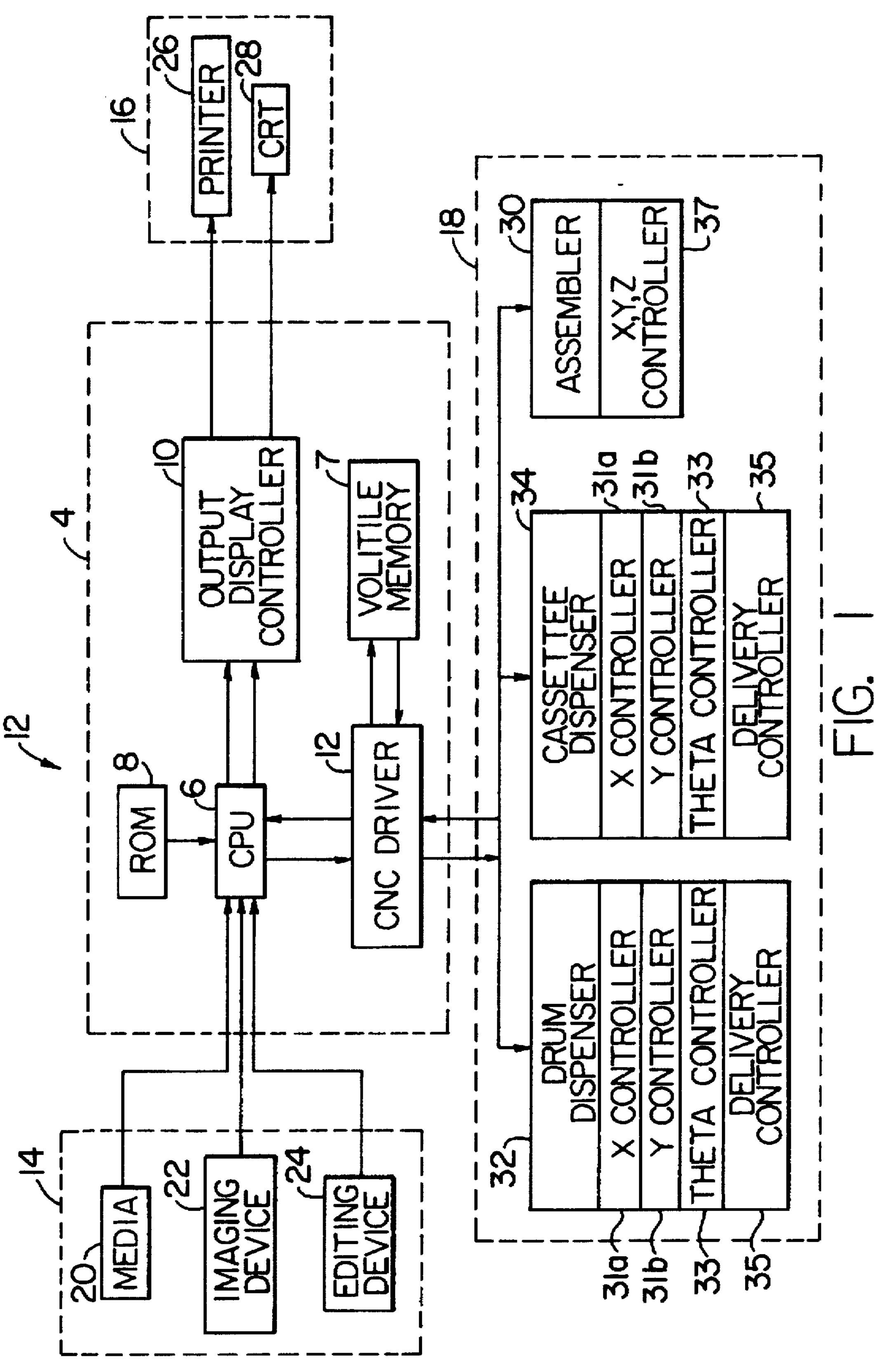
FIG. 1 is a schematic of the control system of the invention.

Referring to the drawings, and first to FIG. 1, a system embodying the invention is there shown schematically and referred to generally by reference numeral 2. The system includes a controller 4, associated input and output peripheral devices 14 and 16 linked to the controller for data input purposes and for projecting data to the user in visual form, and handling means 18 driven by the controller in conjunction with the data input through the devices 14 for causing tile pieces to be placed onto a support surface in a manner which will hereinafter become apparent.

The controller 4 includes a central processing unit 6 which is linked through an appropriate bus to a read only memory location 8 in which a tiling execution program is stored, a volatile memory location 7 for storing the digitized data taken from the input means 14, and an output display controller 10 linked to the central processing unit 6 for driving the output devices 16 to display or print an image of the desired design. The controller 4 further includes a positioning means driver 12 which is linked to the central processing unit 6 and to the handling means 18. The driver 12 is responsible for translating the theoretical coordinate locations of individual tile pieces given to it by the processing unit 6 into machine numeric control language for driving the handling means 18 to place the tilings at given locations on a support surface.

The input devices 14 are responsible for generating a desired pattern to be followed by the tile pieces. For this purpose, the design may be fashioned from one of a variety of designs stored in a library, for example, as encoded information on a disc 20. Alternatively, the design may be derived from an imaging device, such as a scanner 22. The images taken from either of these sources are capable of being used in conjunction with an editing device 24 for the purpose of altering the image that is input to the controller. The peripheral output means 16 includes a color printer 26 and a video display 28 linked to the output display controller 10 which allow the operator to see the selected image in hard copy or in screen display, prior to the actual creation of the tile plates. Thus, the display means 16 is capable of providing either in hard copy or electronically, a portrayal of the pattern as it would look in the intended environment as will hereinafter become apparent with other aspects of the invention.

The controller 4 drives the handling means 18 to cause tile pieces to be deposited on a plate material M to create free standing tile plates in accordance with an executing program which is stored in memory at location 8. By free standing it is meant that the tile pieces are attached to the plate material so that each plate is capable of being moved and applied separately. The handling means 18 for this purpose may either include a cassette assembler 30 used in conjunction with a coordinate controlled cassette-type tile dispensing device 34, or a drum type dispensing device 32 used in lieu of the former combination. Each of the devices which makes up the handling means 18 is responsive to commands issued by the driver 12. To this end, each of the coordinate controlled dispensing devices 32,34 has appropriate X, Y control and positioning means 31*a*, 31*b*, a theta control means 33, and a delivery means controller 35, while the assembler device 30 is provided with X, Y, Z axis control means 37.

Tile pieces are arranged by the coordinate controlled handling means 18 on a support surface overlaid with the material M which ultimately constitutes a plate. The plates are themselves a depiction of separate designs which, when taken together, combine to generate the overall mosaic pattern when assembled on a substrate surface. Additionally, the plates may take many different forms as will become apparent, but, in the preferred embodiment, the material is made from a mesh or gauze type material which is capable of being easily cut into smaller blocks sized in accordance with industry standards to form the individual plates.

Figure 2:
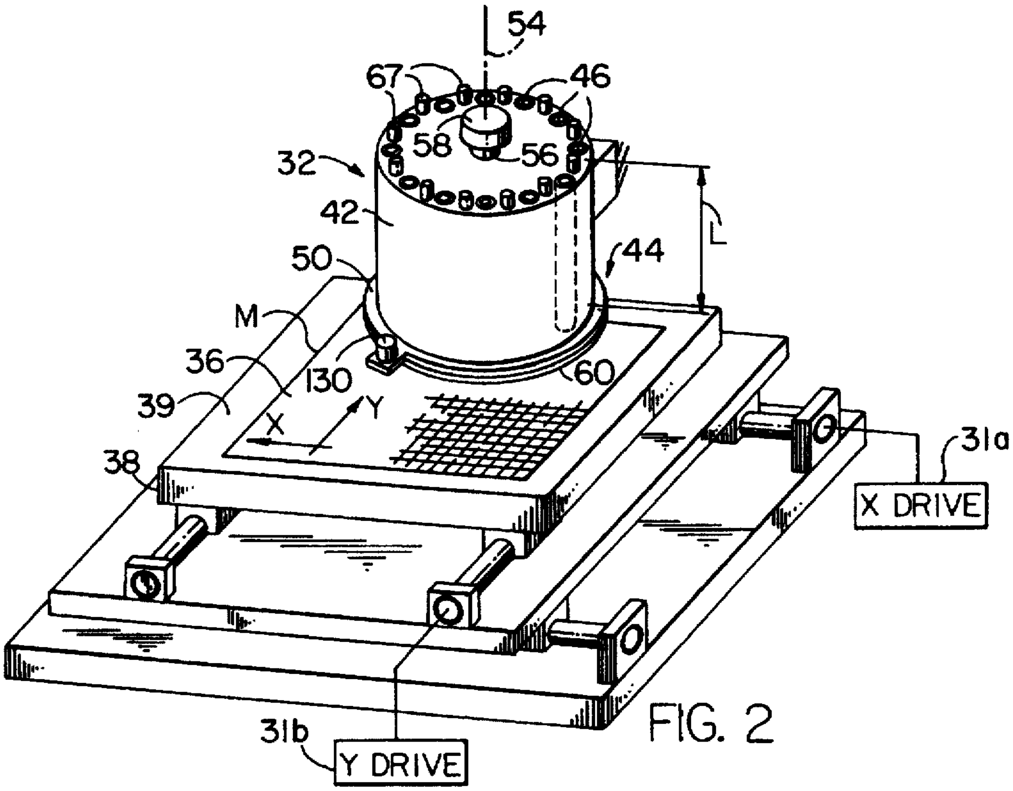
FIGS. 2 and 2*a* show respectively a perspective and top view of a drum dispenser type tile applicator.
Figure 2A:
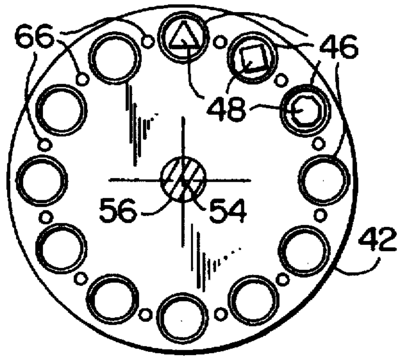
Figure 2B:
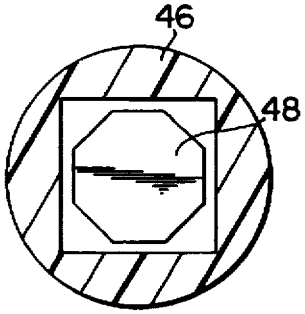
FIG. 2*b* illustrates in detail a sleeve of the applicator of FIG. 2 with a tile piece disposed within its confines.
Figure 3:
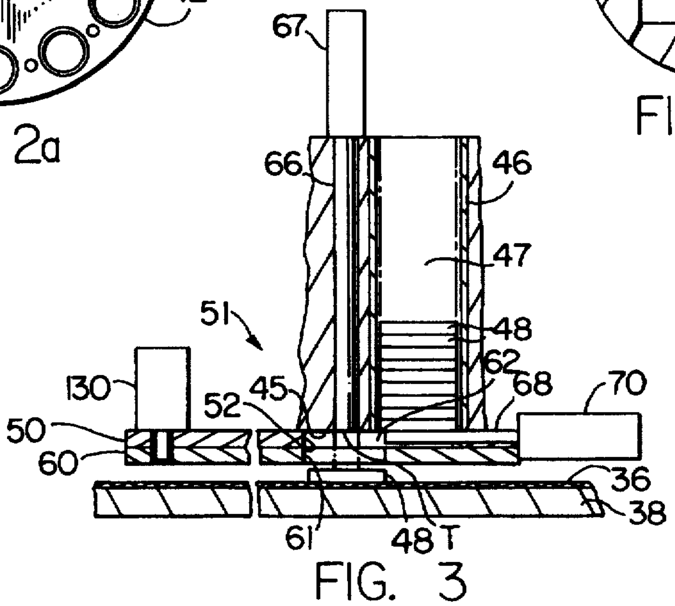
FIG. 3 is a partially fragmentary vertical sectional view of a tile delivery device.

In FIG. 2 a drum type dispensing device 32 is shown. The material M which constitutes the plate 36 is supported on a platen 38 having an exposed upper support surface 39 and is capable of being moved in the indicated X and Y coordinate directions. In addition to the platen 38, the apparatus shown in FIG. 2 is constituted by a drum portion 42 and a delivery portion 44 juxtaposed below it. As shown in FIG. 2*a*, the drum portion has a plurality of sleeves 46,46 which extend along its length L and are disposed circumferentially about its periphery. In transverse cross-section, the sleeves have an internally shaped passage 47 sized to receive correspondingly or otherwise compatibly shaped and sized tile pieces 48,48 in stack form. That is, as shown in FIG. 2*b*, the internal passage 47 does not necessarily have to have the exact shape of the tile piece received within it, but only a shape that is compatible, such as with the octagonal tile piece 48 and the square-shaped passage 47. The delivery portion 44 of the apparatus, as best shown in FIG. 3, is comprised of a delivery means 51 which includes a planar holding member 50 mounted against the bottom face 45 of the drum portion 42 and is rotatable about a central axis 54. A shaft 56 is provided and is journalled for rotation on the drum portion 42 about the axis 54. The shaft is drivingly connected at its upper end to a positioning motor 58 and is fixed at its lower end to the holding member 50 at its center. The motor 58 is linked to the theta control means 33 of the handling device 32 and is thus capable of being controllably rotated in either direction.

The holding member 50 has an opening 52 formed in it sized suitably to allow a single tile piece to be ejected from the drum portion 42 at a designated location on the platen. A planar closure member 60 is fixed to and is disposed below the holding member 50 so as to partially cover the opening 52 over an area corresponding in size to that of the sleeves 46,46. This arrangement prevents tile pieces from falling directly downwardly from the sleeves and instead creates a chamber 62 in which a single tile piece is received. Juxtaposed relative to each of the sleeves 46 is a reciprocating rod 66 connected at its upper end to an actuator 67 secured to the top of the drum portion of the apparatus. Each rod is capable of being reciprocated between a retracted position wherein the lower tip T of the rod is maintained within the drum portion and an extended position wherein the tip of the rod extends beyond the lower face 45 of the drum and into the chamber 62 as illustrated in phantom line. A discharge opening 61 is formed in the closure member 60 and is sufficiently wide to permit the passage of a single tile piece through the closure member 60 when aligned with the one of the rods 66 responsible for striking the involved tile piece.

The delivery means 51 further includes a laterally moveable shuttle member 68 which is drivingly connected to an associated conventional actuator 70 which is controlled by the delivery means controller 35. The shuttle member 68 is itself moveable between an extended position in which it extends into the chamber 62, as shown, and a retracted position wherein it is maintained out of interference with the tile pieces which drop from the sleeve disposed above it.

In operation, the holding member 50 is controllably rotated to a position as shown in FIG. 3 wherein the chamber 62 is located generally in line with a selected one of the sleeves 46,46 containing the tile pieces to be deposited. With the discharge of each tile piece, a corresponding positional movement of the platen 38 will occur to move the platen to the next predetermined location beneath the delivery means 51. In this dispensing condition, the discharge opening 61 is located slightly laterally offset from the sleeve involved in the discharge process and is thus positioned in line with the striking rod 66. During this alignment process, the shuttle member 68 is normally in its chambered position, thus blocking the downward travel of the tile pieces. In the discharging process however, the shuttle member is retracted allowing one of the tile pieces to drop into the chamber and thereafter be moved linearly laterally by the travel of the shuttle member 68. In so doing, the involved tile piece becomes located along the line of action of the rod 66 associated with the selected sleeve and is thereafter tamped by the action of the rod down onto the platen. When a different tile shape is to be dispensed, the holding member 50 is again rotated to bring the chamber 62 beneath the next adjacent sleeve which carries the next tile shape or color to be deposited.

Figure 4A:
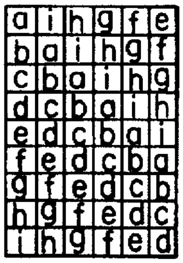
FIGS. 4*a* and 4*b* illustrate possible routes that may be taken to place tiles on a plate.
Figure 4B:
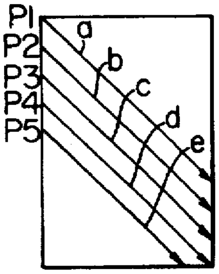

The controller directs the dispensing device 32 to deliver the tile pieces in the most efficient manner possible. To effect this, and depending on the type of design to be created, the dispensing device 32 will deliver all the tiles of a single sleeve onto the platen 38 at one time. The arrangement of tilings in the design of FIG. 4*a* is such that tile pieces of the same type and/or color extend diagonally. Thus, the platen as shown in FIG. 4*b* is moved along a first diagonal P1 to deposit tile pieces of the "a" type, and then follows a second delivery path P2 along which "b" type tile pieces are dispensed, followed in similar manner until all "c", "d", and "e" type tile pieces have been deposited on the platen.

Figure 5A:
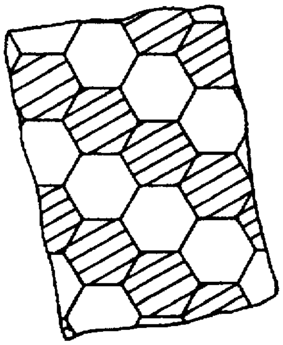
FIGS. 5*a*, 5*b*, and 5*c* illustrate monohedral tilings made up of regular polygons.
Figure 5B:
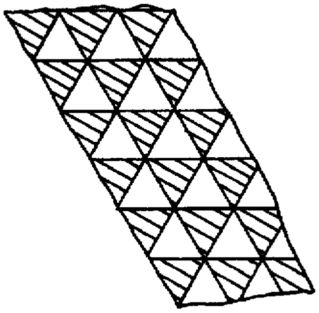
Figure 5C:
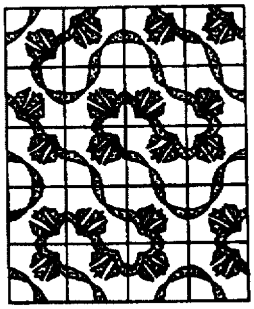

The drum type dispensing device 32 shown in FIG. 2 is well suited for creating monohedral tilings comprised of regular polygons, e.g. hexagons, triangles, or squares. In the case of FIG. 5*a*, a monohedral mosaic comprised of hexagonal shaped tile pieces arranged in alternating colored rows are dispensed in a manner similar to that disclosed with reference to FIGS. 4*a* and 4*b* to achieve this effect. In FIG. 5*b*, a monohedral mosaic is shown which is comprised of a plurality of identical equilateral triangles. The triangles shown in shade line are highlighted to indicate that they are angularly offset relative to those which are unshaded by forty-five degrees. Thus, in at least two of the sleeves 46,46 contained in the drum portion of the apparatus 32, two stacks of triangular tile pieces of identical size are contained, each held within the drum at angular orientations differing by forty-five degrees. The dispensing device 32 is also used where the tile pieces are squares of the same size, but carry specific designs which must be oriented in different angular orientations, e.g. at ninety degree offsets, to create a desired pattern, as shown in FIG. 5*c*. The tile pieces 48,48 may be ones, such as disclosed in U.S. Pat. No. 4,546,025 entitled MULTILATERAL EDGE UNIT HAVING AN ASYMMETRICAL DESIGN THAT EXTENDS TO THE LATERAL EDGES issued on Oct. 8, 1985, having two side edges which are complementary to one another to create a repeating or non-repeating design as determined by the user and as directed by applicable software.

Turning now to FIGS. 6 through 10, and in particular to the cassette type dispensing device 34 shown therein, it should be seen that this dispensing device employs one or more sleeves 79, 79, which am carried by a Y-carriage 86 above a stationary support surface 85 traversed by an X-carriage 88 movable in the X-coordinate direction and carrying the Y-carriage 86 for movement along its length. Each sleeve 79, 79 includes a cassette 82 having an internal passage 81 and a tile delivery means 84 connected for communication with one another and secured to the Y-carriage 86 through the intermediary of a mounting part 83. The X and Y carriages are each driven respectively by positioning motors (not shown) linked to the associated X, Y position control means 31*a*, 31*b* of the control system.

The delivery means 84 of the device 34 operates similarly and is in essence identical componentwise to the means shown in FIG. 3 in that it is comprised of a planar holding member 50', a shuttle means 68 drivingly connected to an actuator 70, and a reciprocating rod 66. This means does not however include a rotatable shaft controlling the rotation of the member 50'. Instead, the delivery means 84 includes a stepper motor 92 mounted to the Y-carriage and linked to the theta control means 33 for controlling the angular orientation of the holding member 50' about the axis 90. Rotation of the holding member 50' occurs through the intermediary of a pinion gear 93 driven by the motor 92 and positively engaging teeth 95 disposed about the outer circumference of the holding member 50'.

Figure 7A:
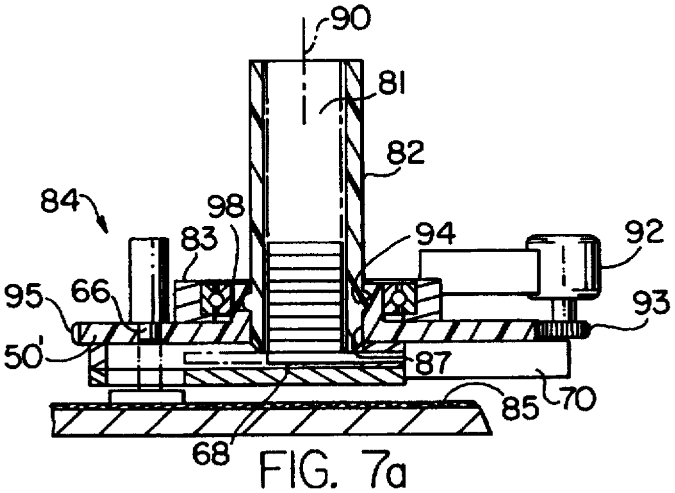
FIG. 7*a* is a partially fragmentary vertical sectional view through the unit of FIG. 7.
Figure 11:
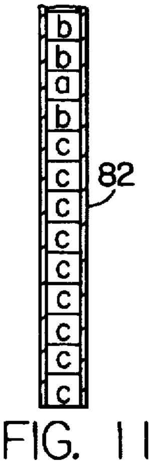

The mounting part 83 is provided as part of the delivery means 84 and is secured to the Y-carriage for supporting the holding member 50' for rotation about the axis 90. The holding member is adapted for connection with the cassette for communication with the delivery means 84. For this purpose, a throat portion 87 is provided and is integrally formed as part of the holding member 50' such that the mounting part is freely rotatably mounted about it. The throat portion 87 and the lower end of the cassette, as shown in FIG. 7*a*, are provided with releasable corresponding mating surfaces in the form of an annular groove 94 formed along the inner wall of the throat portion 87 which cooperates with a radially outwardly extending rib 98 disposed on the lower end of the cassette to create a snap fitting connection therebetween. The cassettes are made from a flexible material, i.e. plastic, to aid in this connection.

Figure 8:
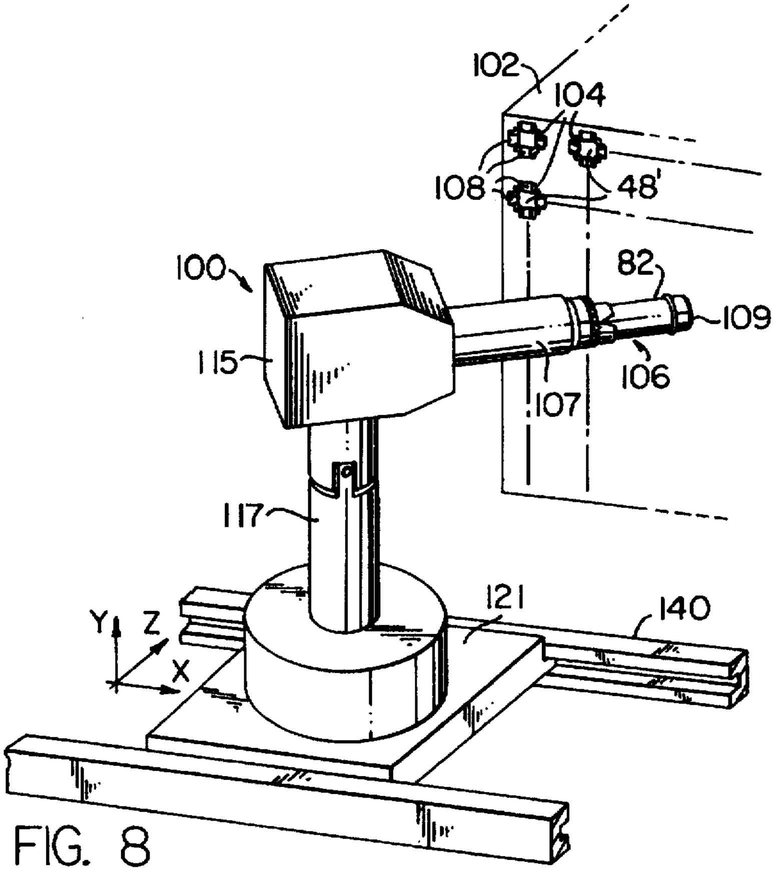
FIG. 8 is a perspective view of a pick and place device used for loading a cassette.

Turning next to FIGS. 8 through 11, it should be seen that the cassettes 82,82 are loaded with respect to the order in which the tile pieces will be deposited along a delivery path to be followed across the support surface 85. As shown in FIG. 8, the assembler is provided and is comprised of a pick and place device 100 used in conjunction with a supply 102 of tile pieces of differing dimension and/or appearance, kept separately from each other in bins 104, 104. The tile pieces stored in the bins 104, 104 may, for example, differ in size, shape, thickness, texture, texture, shading and/or color, The apparatus 100 includes a track means 140 and a base 121 movable in a conventional manner along the track means 140 in the illustrated X-coordinate direction. The base 121 supports a body member 115 through the intermediary of an extendible mast 117 vertically movable in the indicated Y-coordinate direction. An arm 106 is attached to the body member 115 and is movable between retracted and extended positions in the indicated Z-coordinate direction through the controlled action of an actuator 107. Each of the parts of the apparatus 100 responsible for generating movement in the indicated X, Y, Z directions is linked respectively to the corresponding part of the control means 37 to effect precision movement along respective ones of the three coordinate axes.

Figure 9:
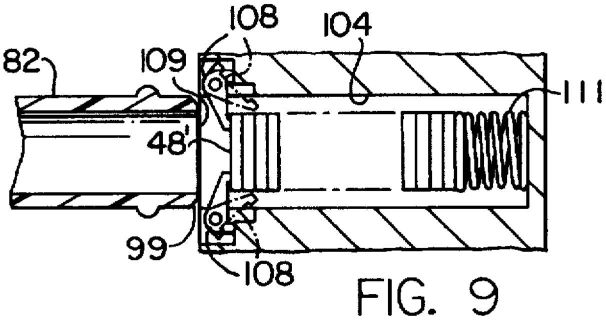
FIG. 9 is a vertical section through a bin illustrating the loading of tiles into a cassette.

As shown in FIG. 9, the tile pieces am arranged in rows in the bins 104,104 and are outwardly biased therefrom by conventional spring members 111. Finger means 108 are provided at the open ends of each bin and engage the outwardmost tile piece 48' for the purpose of preventing its ejection prior to its intended withdrawal from the bins. The finger means 108 are radially compliant members which are normally inwardly biased to engage the peripheral edges of the outwardmost tile piece 48' so as frictionally to keep it from being ejected. The arm 106 of the apparatus 100 in the identified embodiment is constituted by a cassette 82 such that the open end 109 of the cassette is cantilevered outwardly from the body member 115 of the apparatus and moveable into and out of engagement with the front faces of the bins 104,104 through the action of the actuator 107. In this way, the open end 109 of the cassette is moved along the Z axis into engagement with a selected one of the bins 104,104 and against the normal radially inward bias of the fingers 108 thereby causing the tile piece to be ejected into the cassette. The open end 109 of the cassette may be chamfered at 99 to effect more effective sliding of the cassette wall between the finger means 108 and the first tile piece 48'.

Figure 6:
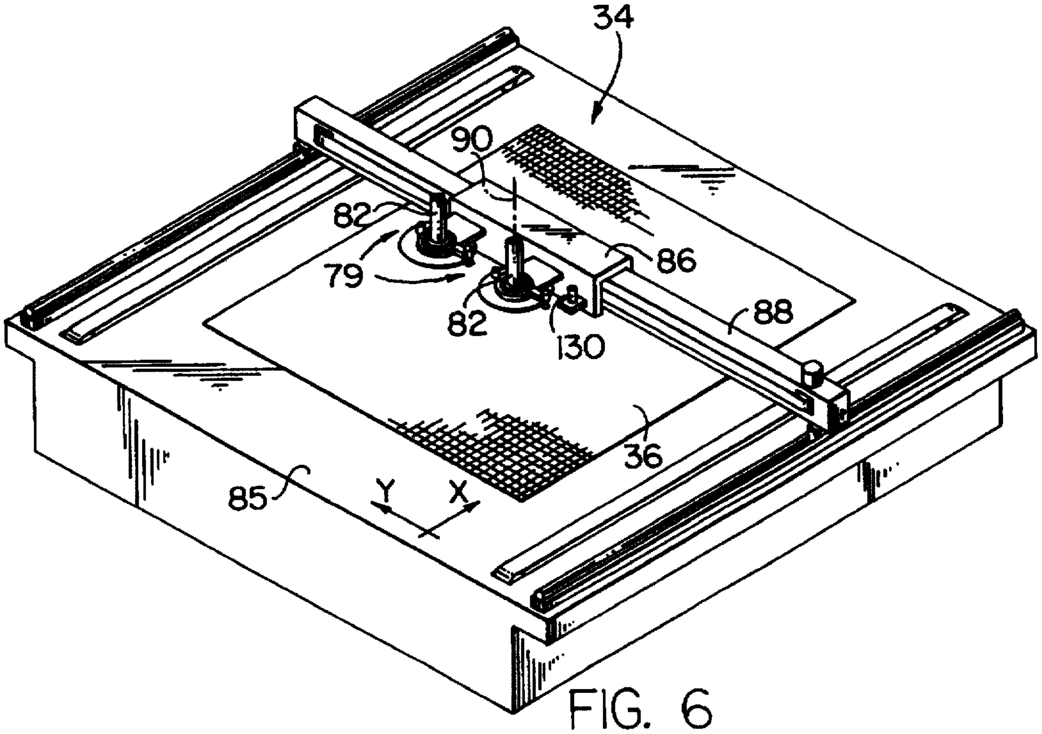
FIG. 6 is a perspective view of a second embodiment of a tile applicator in the form of a cassette dispenser.
Figure 7:
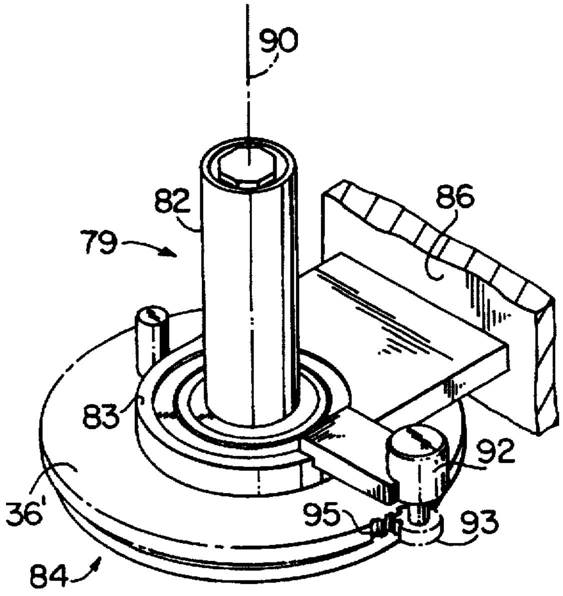
FIG. 7 is a perspective view of the dispensing unit shown apart from the device of FIG. 6.
Figure 10:
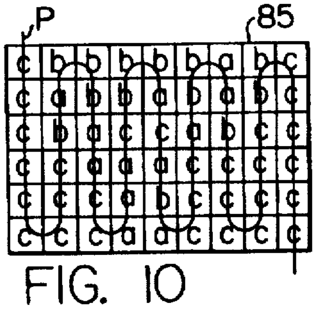
FIGS. 10 and 11 illustrate the relationship between a path taken to deposit the tile pieces and the corresponding manner in which the cassette is loaded.

In FIG. 10, an example is shown of a path P taken by the cassette delivery apparatus of FIG. 6 over the support surface 85 in order to deposit tile pieces in a given arrangement onto that surface. The path so followed is generally serpentine so as to deposit the tiles in the most efficient manner possible. As is apparent from FIG. 11, the pick and place apparatus 100 loads the tile pieces into each cassette 82 in the order that these pieces will be dispensed along the predetermined path P to effect this efficiency of movement. Also, by providing a pick and place apparatus which is separate from the dispensing apparatus 34, parallel operations, i.e. tile dispensing and cassette loading, can take place, thereby further reducing the overall performance time for the system.

Figure 12A:
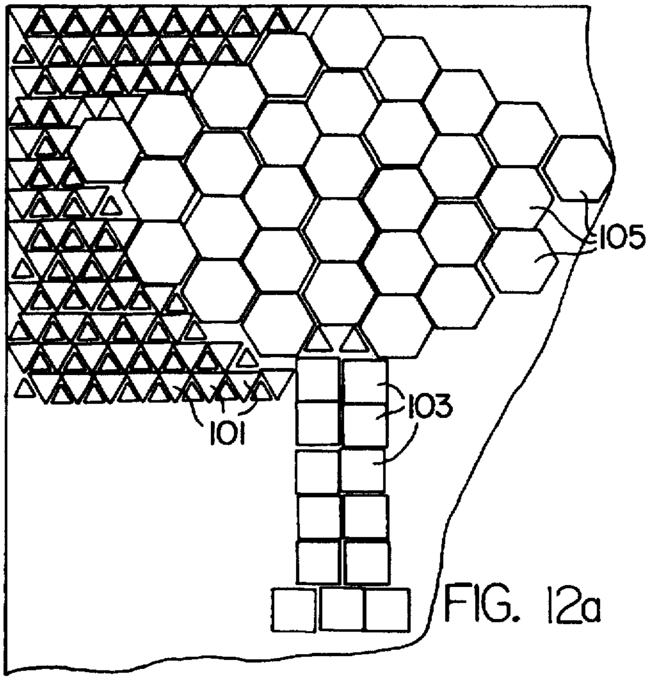
FIG. 12*a* illustrates a mosaic made by regular polygons to create a desired design using a skewing feature.

The simulated mosaic shown in FIG. 12*a* is comprised of three regular polygons, i.e. triangular 101, square 103 and hexagonal 105 shapes, which together create a desired image. In the illustrated embodiment, each polygon shape is respectively contained in one of three cassettes carried by the Y-carriage of the device 34. As with the sleeves 46,46 of the drum type dispenser, each cassette has an interior passage 81 correspondingly or otherwise compatibly sized and shaped to receive the tile shape and size designated for it.

Figure 12B:
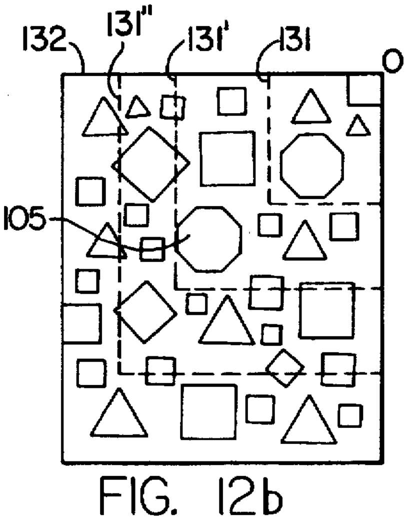
FIG. 12*b* illustrates a mosaic made by the randomized placing feature of the invention.

Returning to the description of the illustrated embodiment, since the delivery means 84 of each sleeve is capable of being rotated about a rotational axis 90, the tile pieces can be deposited in infinite angular orientations thus leading to the creation of numerous artistic effects. Among these, as seen in FIG. 12*a*, is the slight skewing effect of the tile pieces off center from one another to simulate the effect of hand craftsmanship. To this end, the controller 4 is provided in memory with an appropriate program which causes the delivery means 84 to deposit the tilings in these desired angular orientations. In keeping with this aspect of the invention, and as illustrated in FIG. 12*b*, a randomizing program may be provided and used randomly to select the size and shape of the tile pieces and thereafter to locate them within a block 132 depicting the dimensions of the plate onto which the tilings will actually be bonded as will be discussed in greater detail with reference to FIG. 16*b*. This is done by designating one corner O as an origin, and thereafter breaking the block up into inclusive section 131,131', 131", each containing the point O as its congruent origin. Randomized selection and orienting of the shapes called for by the program are next fit into each section within certain tolerances starting from the section closest to the origin O. Each section is sized to receive the largest designated shape within the set tolerances, so that a total randomized fitting is accomplished throughout the block.

Figure 13A:
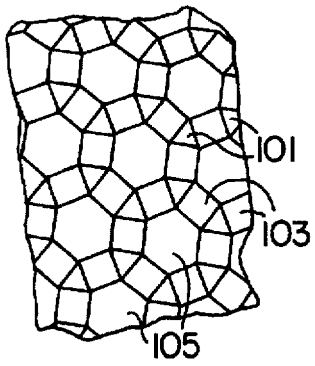
FIGS. 13*a*, 13*b*, and 13*c* show alternative designs capable of being created by the apparatus of the invention.
Figure 13B:
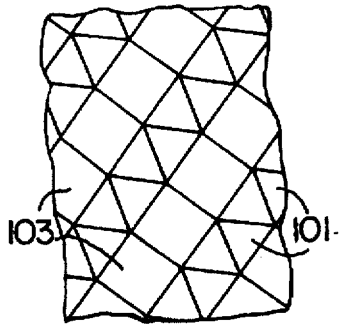
Figure 13C:
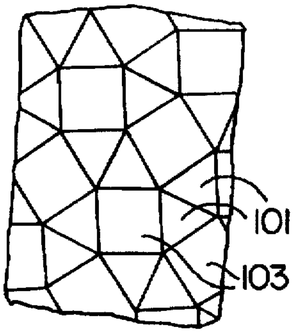
Figure 14A:
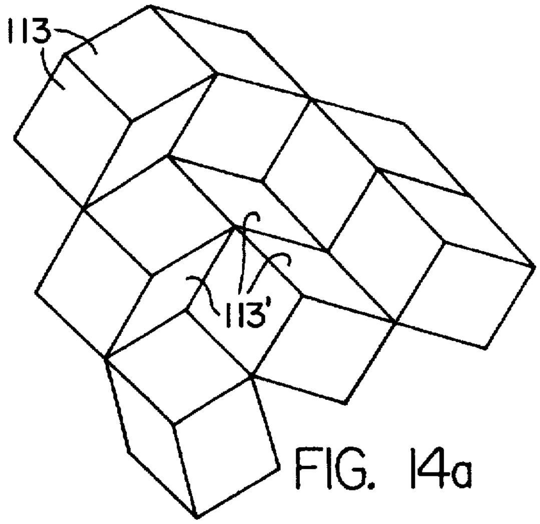
FIG. 14*a* shows a quasiperiodic mosaic made from the two shapes of FIG. 14*b*.
Figure 14B:
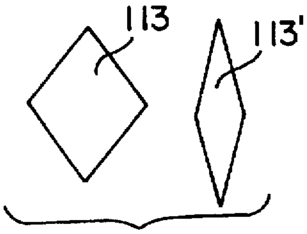

The rotatable feature of the delivery means in the apparatus 34 enables patterns, such as shown in FIGS. 13a–13c which use combinations of triangular 101, square 103 and/or hexagonal 105 shapes disposed at different angular orientations, to be created as prescribed by the controlling algorithm. Also, this apparatus is particularly well suited for the creation of quasiperiodic patterns such as the one shown in FIG. 14a. The tilings used for this pattern, as shown in FIG. 14b, are two diamond-shaped pieces 113 and 113', each differing sizewise, but nevertheless having between them at least one equal side edge. These pieces are loaded into respective separate ones of the sleeves 79,79 and deposited at positions and in varying angular orientations prescribed by the rules governing quasiperiodic patterns to achieve the three dimensional effect illustrated in FIG. 14a.

Figure 16A:
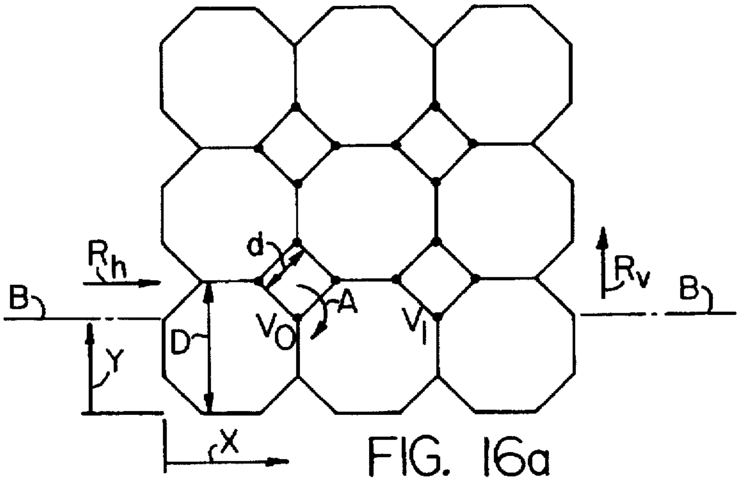
FIGS. 16*a* and 16*b* illustrate tile laying out processes in accordance with the flowchart of FIG. 15.
Figure 15:
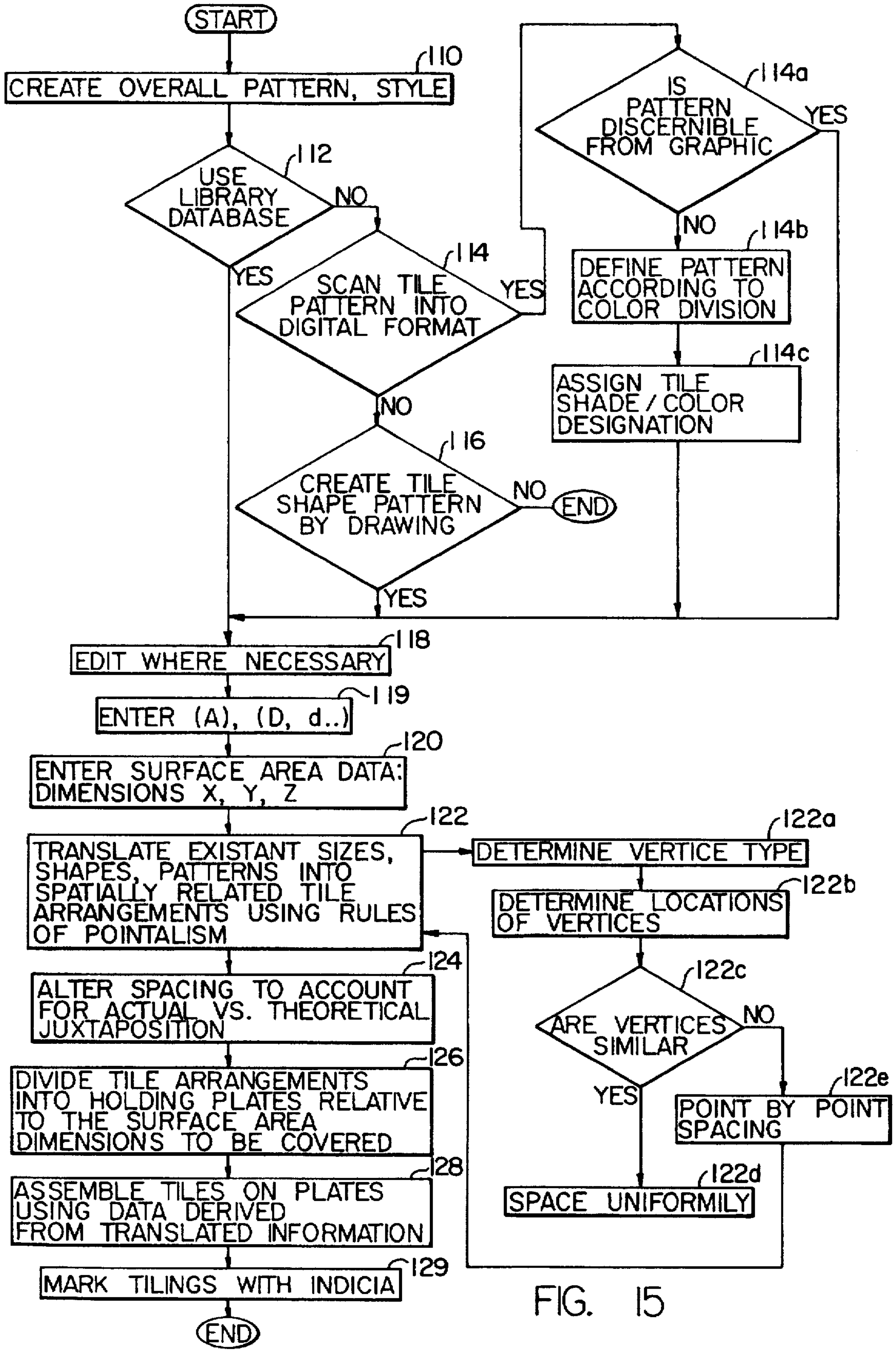
FIG. 15 is a flowchart illustrating the process by which tile pieces are arranged.
Figure 16B:
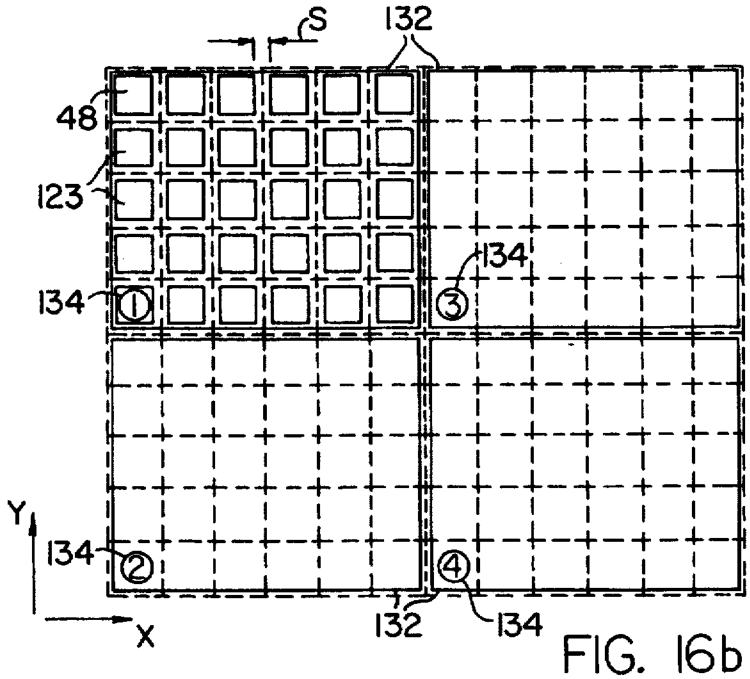
Figure 17A:
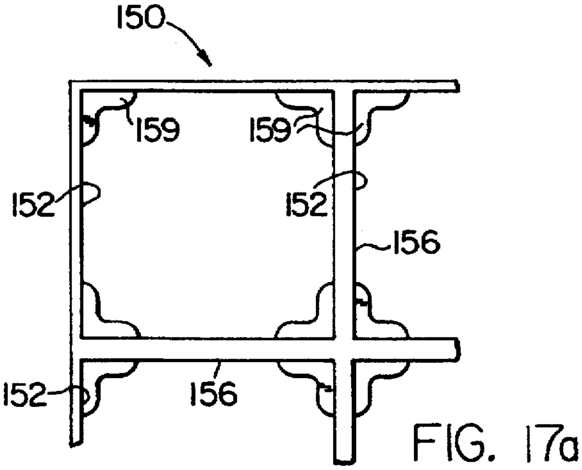
FIGS. 17*a*, 17*b*, and 17*c* illustrate an embodiment of a tile holding plate.
Figure 21:
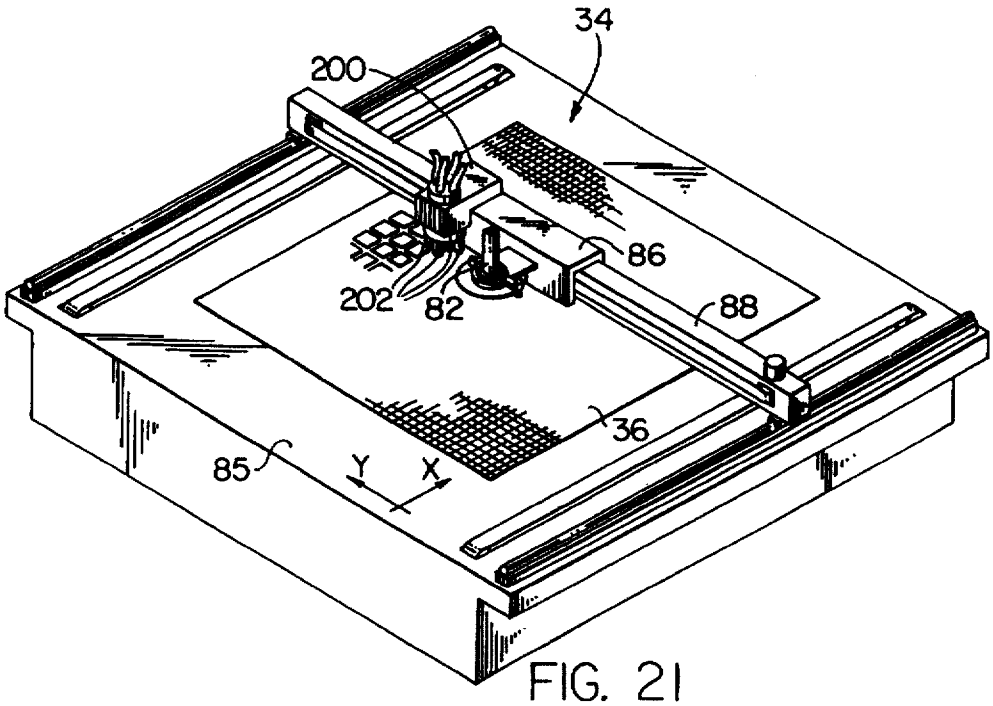
FIG. 21 illustrates in perspective view a spray jet usable with the delivery means.
Figure 23:
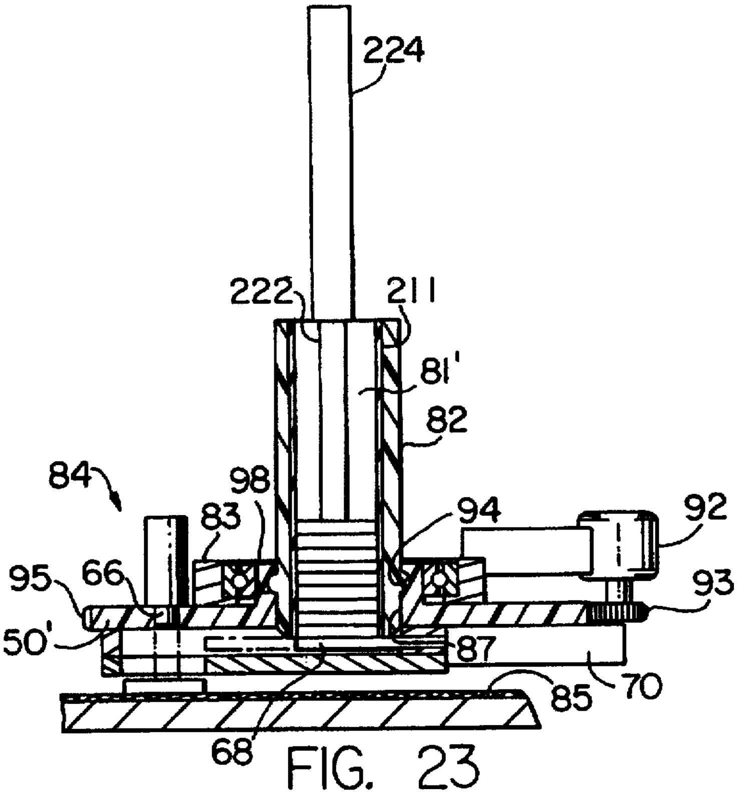
FIG. 23 is a sectional view of an alternative embodiment of the dispensing unit shown in FIG. 7*a*.
Figure 24A:
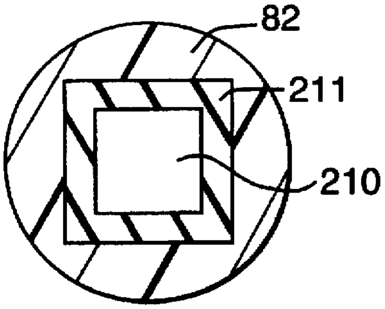
FIG. 24*a–e* are partial sectional views illustrating selected tile pieces received within cassette forming a part of the dispensing unit shown in FIG. 23.
Figure 24B:
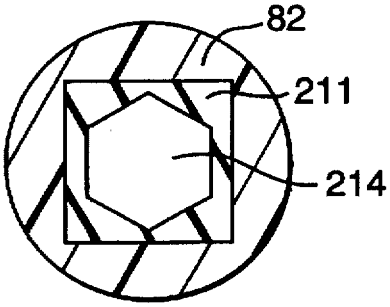
Figure 24C:
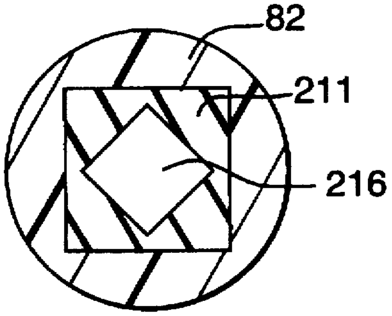
Figure 24D:
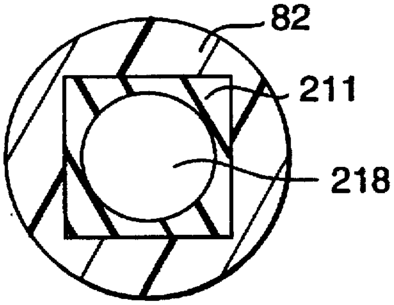
Figure 24E:
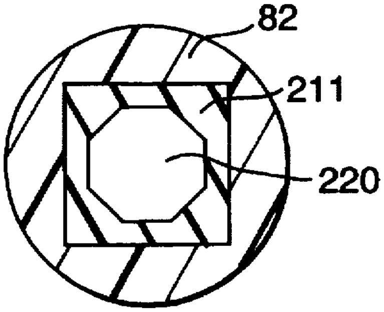

Turning now to FIGS. 15 and FIGS. 16a, 16b, a method of laying out tile pieces in a desired pattern in accordance with the rules of pointillism is disclosed. The first step is in effect to generate an overall style or pattern to be followed by the tile pieces (Step 110). To this end, the user can generate the overall pattern using one of several different methods provided by the system. One option is to use data already stored in memory in the library 20 (Step 112) which is representative of the design to be portrayed. Alternatively, the desired design can be scanned from a photograph or other hard copy medium and subsequently translated by the imaging device 22 into digital format (Step 114). The design can alternatively be drawn using the editing device 24 to create a desired tile pattern from scratch (Step 116). The editing device 24 may further be used in conjunction with the scanner or the library memory to alter the images that have been either scanned (Step 114) or downloaded from the library (Step 112), if change is desired (Step 118). In the case where scanning is used to initially generate a pattern, it must be determined from the graphic scanned whether or not the pattern lines to be followed by the tile pieces are discernible (Step 114). If such pattern lines are discernible, then the program returns to its main flow. However, if pattern lines are not recognizable, such as in the case of a photograph where only color or shade divisions exists, then the pattern lines to be followed by the tilings are defined in terms of color/shade division or separation for the involved image (Step 114b). Thereafter, color or shade designations are assigned to each region of the pattern which are separated by the pattern lines (Step 114c). The assigning of color designations at this step is useful in two ways. The first may be the use of this information as a guide for the selection of precolored tilings using the pick and place system illustrated in FIG. 8, while the alternative use for this information would be to drive a tile painting machine to color regions on otherwise plain white tilings, such as shown in FIG. 21.

Next, the description of the tile pieces to be used is entered. The system assumes that all pieces are regular in shape. The user inputs the shape by the number of sides (n) of the tiling, i.e. (5) for a pentagon (4) for a square etc. The dimensions (D, d) of the shapes are also entered followed by any copy color or other designation, such as, for example material type, which may be required (Step 119). The dimensions (D, d) are controlled primarily by the sizes and shapes of the tile pieces available in inventory, and by those which are capable of being loaded into the supply sleeves of the dispensing devices. In the case where a discernible pattern is scanned, the shape (i.e. the number "n") of the tile piece is determined by a pattern recognition program while the dimensions of the tilings are calculated and scaled according to the sizes available in inventory.

Since it is ultimately the goal of the system to arrange tile pieces in a manner which fits the substrate surface intended to be covered, it is thus necessary to provide the executing program with data identifying the dimensions of that surface. The surface to be covered is assumed to be a planar. However, several such surfaces are capable of being portrayed, for example, as an interior space and oriented in three dimensions. Thus, three coordinate dimensions (X, Y, Z) for a given surface are entered (Step 120). Once the controller 4 receives the surface area dimensions input to it at (Step 120), it stores this data along with the data which represents the pattern to be portrayed input at steps 110–117 for use later.

Following this, the executing program translates the existent shapes, designs or patterns which were inputted into the computer at steps 110 through 117 into spatially related tile arrangements based on the actual dimensions of the surface and the tilings to be used using known rules of pointillism or a randomizing function as discussed with reference to FIG. 12b. This process ultimately results in tile pieces each being assigned given X, Y coordinate locations on the plate material M to be covered with a tile piece. The collection of these coordinate locations reflects the creation of the overall mosaic.

The process (Step 122) followed for spatially relating one tile piece to the next is done by determining the locations of the vertices of the tilings relative to where they will lie on the substrate surface. The vertices of a tiling, as best shown in FIG. 16a by the letter V, are the junctures of the edges of adjacently positioned tilings. As discussed with reference to step 119, regular polygon shapes are identified by the value n representative of the number of sides for each shape. A polygon having "n" sides and therefore "n" corners, is identified, for example, as (3), if a triangle, as (4), if a square, etc. Since the program assumes tilings of nonrandomized edge-to-edge construction, that is, that each side of a tile is also the side of precisely another tile, the vertices of the tilings are thus regular and can be predicted.

In dealing with polygons of a regular shape, there are 21 known types of vertices possible for any combination of regular polygonals. These known vertice types are stored in memory to be recalled on an as needed basis once the combination of tilings surrounding a given vertice is known. Each vertice type is thus identified by determining the types of polygons which are fitted around that vertice (Step 122a). For example, in FIG. 16a, vertice "$V_o$" would be identified as (4,8,8) corresponding to the previously determined (n) sided polygons which surround it, taken in rotation in the direction shown by arrow "A". Using this initial identifying data, the types and positions of each remaining vertice in the design are determined based on the vertice $V_o$ being the origin (Step 122b). This is done using the initial vertice $V_o$ as a starting point in combination with the known dimensions D,d of the polygons which surround it. Subsequent vertice locations, such as that for $V_1$, are determined horizontally along line $R_h$ for the width dimension of the surface area to be covered, which dimension corresponds to the value X input previously. The vertical components of the vertice locations taken in the direction $R_v$ above base line B are established relative to this line by again using the inputted dimensions (D, d) in conjunction with the data which identifies each vertice along the base line. In the case of the polygon array shown in FIG. 16a, the vertices of this arrangement are all of the same type. Thus, once the distances between vertices have been established in the $R_h$ and $R_v$ directions for a given arrangement of polygons fitted around a repeated vertice type, all subsequent vertices can thus be determined by positioning them at uniform intervals from one another (Step 122d) based on the data taken about vertice $V_o$. There are 11 such polygonal arrangements in which all vertices are the same. These vertices are stored in memory and can be retrieved on an as needed basis as follows:

$(3^6)$, $(3^4.6)$, $(3^3.4^2)$, $(3^2.4.3.4)$,
$(3.4.6.4)$, $(3.6.3.6)$, $(3.12^2)$, $(4^4)$,
$(4.6.12)$, $(4.8^2)$ and $(6^3)$ In the case where vertice types are not ones of the type listed above (Step 122*c*), a point by point determination of the placement of each vertice must be made based on an examination of the placement and type of vertice which precedes it (Step 122*e*) in the previously discussed manner.

The controller 4 thus effectively creates a theoretical arrangement of the tile pieces which is the direct result of the translating operation at (Step 122). However, this arrangement as denoted by the dashed lines in FIG. 16*b* depicts the theoretical juxtaposition of the tiles rather than actual and does not take into account the spacing S needed for grout to be applied between the tile pieces in patterns which call for it. Thus, (Step 124) the controller causes the theoretical juxtaposition of the tilings to be altered as shown in solid line by the pieces 123 to allow for the spacing S.

Once the actual positions of the tile pieces are calculated, the controller next lays out the tilings in terms of separate plates which will actually be laid down onto the substrate surface (step 126). This is done through an appropriate algorithm which causes the tilings as arranged in memory to be divided into blocks 132 having areas which depict areas of the plates 36,36 on which each tile piece will eventually be attached. A code is assigned to each of the blocks 132 to identify to the user where the plate is to be positioned on the substrate surface relative to other such plates. Then, the tile pieces are deposited onto the support surface 85 at predetermined X, Y locations as prescribed by the foregoing algorithms (Step 128). The code is marked as indicia 134 onto the plate by a marker or labeler 130 provided on the dispensing apparatus for the purpose of providing identification of its placement in the overall design (Step 129). The marker or labeler is preferably one manufactured by Gerber Garment Technology, Inc. of Tolland, Conn. and disclosed in U.S. Pat. No. 4,764,880 entitled COMPOUND PLOTTING APPARATUS AND RELATED METHOD OF OPERATION. Further, the plate material M on which the tile pieces am laid will usually be greater in area than the area allotted for the blocks 132, i.e. two or more blocks may actually fit onto the material M as spread over the support surface 85. To this end, the dispensing apparatus shown in FIGS. 2 and 6 may include a roller cutter which depends, respectively, from the holding plate 36 and the Y carriage 86 of each illustrated device, and is sized to fit within the spacing S to cut the material M along lines corresponding to the dimensions of the blocks 132,132.

In addition to its use as a marker for making the indicia 134, the marker 130 is employed to draw an edge line on the tile pieces which make up the end row of a given plate, denoting the line along which the tile pieces must be cut to effect an edgewise fit with the edge of the surface to be covered. The line is drawn on these tile pieces based on a determination of what portion of the end tiles extends beyond the vertical and horizontal extents (i.e. X, Y dimensions) of the involved surface.

In FIGS. 17–20, several different embodiments of the material used for the plates are shown, each of which includes a specific means for securing the tile pieces 48,48 to the plate material. In FIGS. 17*a*–17*c*, a first embodiment of a holding plate 150 is shown in fragmentary view. This plate includes a receiving means 154 comprised of a plurality of separate compartments or chambers 152 each defined by an upstanding wall 156 which separates the plate 150 into grids for receiving tile pieces in a defined angular orientation. A web 159 is provided and is disposed at the base of the partitioning walls at the intersection between adjacent side walls. The web provides a seat against which each tile piece sits and is prevented from passing through the plate from its bottom end. Each chamber at its top end has an inwardly directed flange 160 which acts as a détente to prevent the withdrawal of the tile pieces from the chambers 152. The material which constitutes the wall 156 and the flange 160 is formed from a pliable material, such as flexible plastic. The tile piece 162 shown in FIG. 17*c* is ready for snap in place insertion into the chamber 152 upon application of the downward force 164 applied by the rods 66, 66 in a manner discussed previously with reference to the operation of the overall delivery mechanism.

Figure 18A:
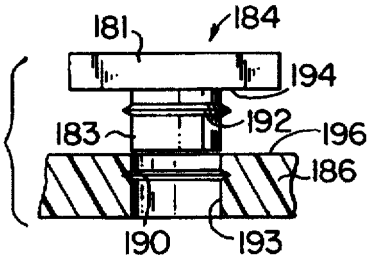
FIGS. 18*a* and 18*b* illustrate an alternative embodiment of a tile holding plate.
Figure 18B:
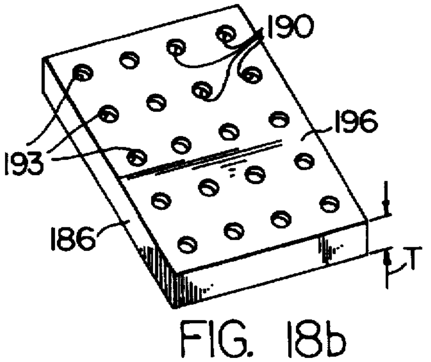

In FIGS. 18*a* and 18*b*, a second embodiment of a plate is shown. The tile pieces 184,184 are configured to be received within corresponding openings 193, 193 formed in the plate 186. Each of the tile pieces for this purpose is generally T-shaped having an upper portion 181 and a lower portion 183 intersecting at a shoulder 194. Each of the plurality of openings 193, 193 formed in the plate 186 has an inwardly directed groove 190 disposed about its perimeter. The groove 190 is sized to receive a correspondingly shaped and sized detent 192 disposed outwardly about a lower portion 183 of the tile piece 184. The shoulder 194 coacts against the upper surface 196 of the plate 186 to add further stability to the connection and is aided to these ends by the plate 186 having a given thickness T which is sufficiently sized to receive the depending end portion 183 of the tile piece 184.

Figure 19:
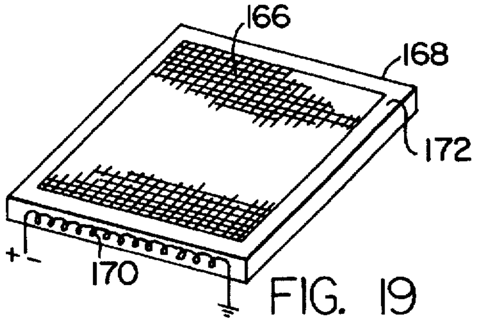
FIG. 19 illustrates a method for bonding tile pieces with the plate material associated with it.

Turning now to FIG. 19 and to an embodiment of a means and method by which the tile pieces are adhered to a plate material 166, it should be seen that this means and method includes a platen 168 having a heating element 170 which causes the top surface 172 of the platen to be heated once it is activated. Upon the surface 172 is placed the plate material 166 onto which the tile pieces are deposited by the apparatus in a manner discussed previously. The plate material 166 is mesh-like in texture having a polymer base which bonds to the tile pieces deposited onto the surface 172 when the heating element is activated to thus bond the tilings in place.

Figure 20:
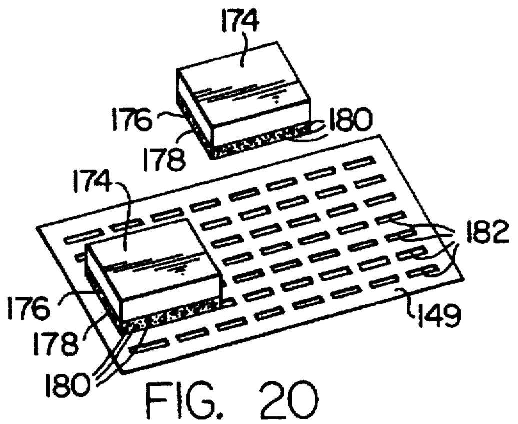
FIG. 20 is a perspective view of an alternative method for applying tiles to the plate.

Referring now to FIG. 20 and to an alternative embodiment of a method and apparatus for attaching tile pieces to a plate material, it should be seen that the tile pieces 174, 174 shown therein are modified versions of the tile pieces discussed previously in that each has a lower surface 176 on which is disposed a layer of activatable adhesive 178. The activatable adhesive layer 178 may be one which includes a plurality of microcapsules 180 which, upon the application of sufficient downward pressure, are caused to burst and release the encapsulated adhesive onto the plate material 149. Alternatively, the layer 178 may be one which employs air bubbles which burst to allow contact between a substrate and an adhesive layer. Such an adhesive is sold commercially by 3M Corporation under the tradename CONTROL TACK. The plate material 149 may be formed from medium weight paper and is sheet-like in form having a plurality of perforations 182 arranged uniformly in rows and in columns. These perforations permit the cement which bonds the tilings to the substrate to pass through the paper and adhere to the undersides of the tile pieces 174.

Figure 22:
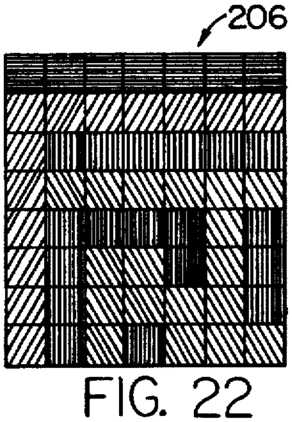
FIG. 22 illustrates a simulated mosaic colored by the spray jet of FIG. 20.
Figure 17C:
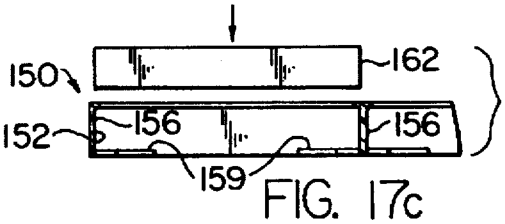
Figure 17B:
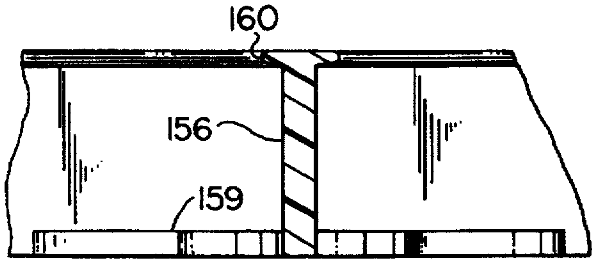

In FIG. 21, a spray jet head 200 is therein shown connected to the controller 4 for the purpose of marking, coloring or shading tile pieces in whole or in part. The head is used in place of the marker 130 and is vertically mounted to the drum portion of the device 32 and to the Y-carriage in the case of the cassette dispenser 34 such that the spray is directed downward and onto the tile pieces situated below it. At least four jets 202 are provided in the head, each responsible for respectively spraying the three primitive colors and black. In the embodiment where the head 200 is used, there is no need to separate tile pieces by color. Rather, tilings can be arranged so as to depict certain colored regions as discussed previously with reference to steps 114*a–c* and thereafter sprayed on. Alternatively, as shown in FIG. 22, the tilings used may be identical in shape and arrangement, but painted on by the head 200 such that each tile piece takes on a pixel-type character with respect to the overall design 206, or the tilings may simply be sprayed on without attempting to give each tile piece a discrete color designation. This approach results in a savings in the number of sleeves, cassettes or bins otherwise dedicated to color separation between inventoried tile pieces. The sprayed tile pieces are thereafter baked in accordance with normal tile making procedure, with the understanding that the material M be sufficiently resistant to the baking temperature.

In connection with the mosaic shown in FIG. 12*a*, it was stated that each of the regular polygons comprising the mosaic was contained within a respective cassette. It should be understood, however, that the invention is not limited in this regard and that individual cassettes can be loaded with tile pieces varying in dimension and/or appearance. Thus, a cassette or collection of cassettes can be preloaded off-line with those tile pieces required to form a mosaic representing a particular graphic according to data defining that graphic. Such off-line loading not only reduces the time required to form a desired mosaic, but also reduces the labor cost associated with loading tile pieces into the cassettes. Moreover, the errors inherent in manual selection of the tile pieces are eliminated, since the pick and place device 100 is automatically controlled by the control means 37 according to the data defining the graphic.

Loading the cassettes with tile pieces having the same, size, shape and thickness or varying in appearance only, such as for example, tile pieces varying in color, texture and/or shading, does not present any difficulty. However, where the tile pieces vary in size and shape, only those tile pieces that can be arranged in a stable stack within the cassette and that can be accurately dispensed from the cassette by the dispensing device 34 are permitted.

As in the case of the sleeves 46, 46, the internal passage 81 of the cassette does not necessarily have to conform exactly to the size and shape of the tile pieces received within it, as long as the shapes and sizes of the various tile pieces are compatible. Thus, a square-shaped passageway is capable of receiving similarly sized square-shaped tile pieces, as well as, for example, similarly sized hexagonal, octagonal or even round tile pieces. Tile pieces having significantly different shapes or sizes cannot be included in the same stack, since individual pieces would likely tilt or skew within the stack, thus rendering the stack unstable and preventing the accurate dispensing of tile pieces by the delivery means 84.

FIG. 22 illustrates a cassette-type dispensing device which is particularly adapted not only to dispense tile pieces of compatible size and shape, but also tile pieces of varying thickness. The dispensing device 34' is similar in many respects to the dispensing device 34 shown in FIGS. 6, 7 and 7*a*, and common elements between the two devices have been given like numbers. The device 34' includes a cassette 82' having an internal passage 81' lined with a resilient material 210, such as rubber, which substantially conforms to tile pieces of varying size and shape, and also frictionally engages the tile pieces to retain them within the cassette. As shown in FIGS. 23*a–e*, the internal passage 81' of the cassette 82' is capable of receiving, for example, square 212, hexagonal 214, diamond-shaped 216, round 218 and octagonal 220 tile pieces of varying size. Those skilled in the art will recognize, that the compatibility requirements for size and shape among the tile pieces are dependent on the type of resilient lining used and the degree to which it is able to conform to the individual tile pieces.

Since the resilient lining retains the tile pieces within the cassette, the dispensing device 34' further comprises a plunger 222 operably connected to an actuator 224. The actuator is under the control of the delivery means controller 35, and the controller directs the actuator to depress the plunger a distance which is equal to the thickness of the bottom tile in the stack to deposit this tile piece onto the planar holding member 50'. Since the controller 35 is ultimately directed by the controller 4 and the tiling execution program, the dispensing device 34' can be used to dispense tiles of varying thickness, as well as those differing in shape, size and appearance. Thus, in the case where a mosaic requires tile pieces of differing size, shape, thickness and appearance, the tile dispensing unit 34' permits off-line preloading of the cassettes 82' with all of the tile pieces comprising the mosaic, within the limits of compatibility discussed above.

By the foregoing description, a method and related apparatus for creating an ordered collection of plates with tilings arranged thereon in a predetermined orientation has been disclosed. However, it should be appreciated that numerous modifications and substitutions may be made without departing from the spirit of the invention. For example, while the shapes of the tile pieces used are assumed to be regular, in actuality, the pieces used may be irregular but will be assumed to have a regular shape based on overall geometry of the piece. Further, where the tile pieces are of uniform thickness but differing in size and/or shape, the resilient lining shown in FIG. 23 need not be made of material which frictionally engages the tile pieces. Thus, such a resilient lining can be added directly to the interior passage 81 of the cassette 82 shown in FIG. 7*a*.

Accordingly, the invention has been described by way of illustration rather than limitation.

I claim:

1. A cassette for receiving and storing tile pieces in stack form comprising:
   - a generally elongate tubular member having a first end and an opposite second end and having an interior confine disposed therebetween;
   - one of said first and second ends being provided with resilient means for biasing the cassette into and out of engagement with a tile piece delivery apparatus;
   - said interior confine of said tubular member being compatibly shaped and sized to receive a plurality of tile pieces therein in a stacked arrangement.

2. A cassette for receiving and storing tile pieces in stack form comprising:
   - a generally elongate tubular member having a first end and an opposite second end and having an interior confine disposed therebetween;
   - one of said first and second ends being provided with a means for releasably connecting the cassette to a tile piece delivery apparatus;
   - said interior confine of said tubular member being compatibly shaped and sized to receive a plurality of tile pieces therein in a stacked arrangement; and a plurality of tile pieces received within the interior confine of the tubular member in stacked arrangement, the tile pieces being stacked according to a predetermined order.

3. The cassette of claim 2 wherein the stack of tiles includes tiles of differing dimension and/or appearance.

4. The cassette of claim 2 wherein said means for releasably connecting the cassette to a delivery apparatus is an annularly extending projection correspondingly sized and configured to be received within a similarly sized and shaped groove in the delivery apparatus.

5. The cassette of claim 4 wherein the one of said first and second ends is provided with a means for releasably connecting the cassette to a tile piece delivery apparatus and further includes an annular chamfer disposed about that end.

6. The cassette of claim 5 wherein the cassette is cylindrical and formed from plastic.

7. The cassette of claim 3 wherein said interior confine further includes means which substantially conforms to the size and shape of the tiles of differing dimension.

8. The cassette of claim 3 wherein the interior confine further includes means which substantially conforms frictionally engages the tile pieces and retains them within the interior confine.

9. The cassette of claim 8 wherein the means which substantially conforms comprises the means which frictionally engages and retains.

10. The cassette of claim 9 wherein the means which substantially conforms and frictionally engages comprises a resilient lining supported within the interior confine.

* * * * *